Patented Mar. 9, 1926.

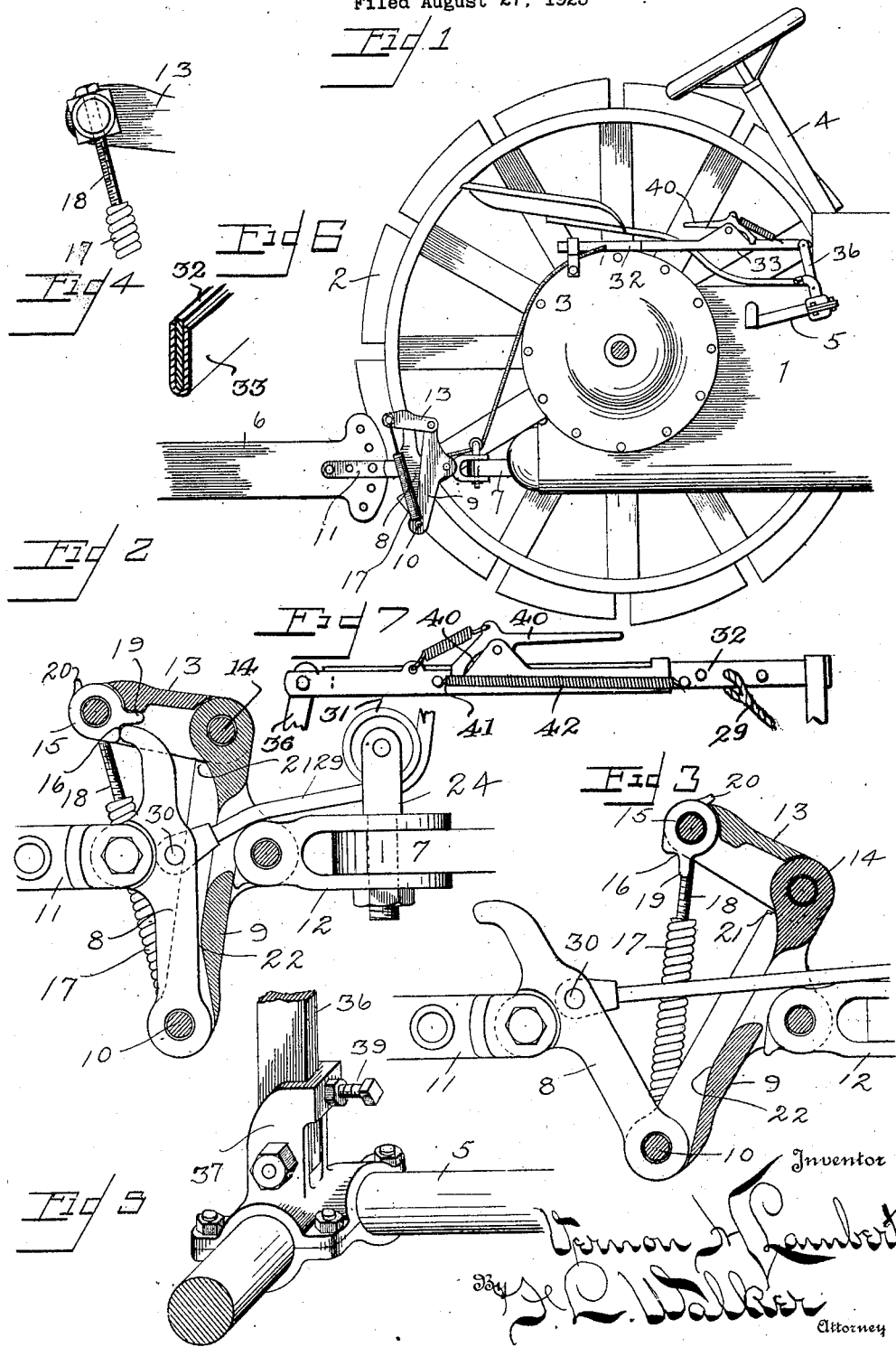

1,575,773

UNITED STATES PATENT OFFICE.

VERNON H. LAMBERT, OF XENIA, OHIO.

TRACTION HITCH.

Application filed August 27, 1923. Serial No. 659,580.

*To all whom it may concern:*

Be it known that I, VERNON H. LAMBERT, a citizen of the United States, residing at Xenia, in the county of Greene and State of Ohio, have invented certain new and useful Improvements in Traction Hitches, of which the following is a specification.

My invention relates to draw bar connections for vehicles and more particularly to a safety hitch or automatically releasable coupling for use with tractor engines and the like which will resist the normal draw bar pull, but which in event the drawn vehicle or implement meets with an obstruction or excessive resistance will automatically release the drawn vehicle to prevent breakage and by the releasing movement arrest the progress of the tractor.

In the present invention there is contemplated a pair of oscillatory arms interpivoted one to the other at one end and interconnected by a releasable latch at their opposite ends, one of the arms being medially coupled to the tractor or leading vehicle and the other medially coupled to the trailing vehicle. The free ends of the coupled arms are releasably interconnected by a spring retracted latch bar, the nose or engaging shoulder of which is revolubly mounted and engaged in an off-center position whereby the separating pull upon the interpivoted arms affects a camming action by which the latch bar is elevated against the tension of its retracting spring to release the arms for outward oscillatory movement about their interpivoted connections. The relative movement of the leading and trailing vehicles afforded by the opening movement of the arms is transmitted to the control mechanism of the tractor or other leading vehicle by a cable or connection which arrests the progress of the vehicle train. The coupling device, upon disengagement, therefore permits a limited independent movement of the vehicles, sufficient to prevent damage to the trailing vehicle but the coupling device is not wholly disconnected but the parts are maintained in relative position for re-engagement upon reversal of the motive power. That is to say, upon backing the leading vehicle, the interpivoted arms will be oscillated toward each other and will be automatically re-engaged by the releasable latch preparatory to further pulling effort. The particular safety coupling or hitch forming the subject matter hereof is preferably though not necessarily employed in conjunction with the automatic takeup device and motor control appliances shown and described in my co-pending application Serial No. 590,403.

The object of the invention is to simplify the structure as well as the means and mode of operation of safety couplings or tractor hitches whereby they will not only be cheapened in construction, but will be more efficient in use, positive in operation, uniform in action, durable, and unlikely to get out of repair.

A further object of the invention is to provide an automatic safety hitch or coupling which may be re-engaged after being disconnected, without the necessity for accurate positioning or alignment of the tractor and drawn implement or vehicle and with minimum effort. This is effected by limiting the relative movement of the vehicles, leaving the coupling parts interconnected while in distended position whereby they will be readily guided back to their normal engaged relation.

A further object of the invention is to provide an improved form of releasable latch mechanism for interconnecting a drawing and trailing vehicle.

With the above primary and other incidental objects in view as will more fully appear in the specification, the invention consists of the features of construction, the parts and combinations thereof, and the mode of operation, or their equivalents, as hereinafter described and set forth in the claims.

In the accompanying drawings wherein is shown the preferred but obviously not necessarily the only form of embodiment of the invention, Fig. 1 is a side elevation of a portion of a tractor and the beam of a drawn implement such as a plow, interconnected by the automatically releasable coupling or safety hitch forming the subject matter hereof. Fig. 2 is a sectional view of the coupling or hitch in its engaged or interconnecting position of adjustment. Fig. 3 is a similar view showing the parts in their operated or released relation. Fig. 4 is a detail view illustrating the adjustable connection for the spring latch.

Fig. 5 is a detail perspective view of the connection of the automatic pedal operating devices with the pedal arm. Fig. 6 is a detail sectional perspective view of the telescopic take-up bar, forming a part of the pedal operating mechanism. Fig. 7 is a side elevation of the automatic takeup device and yielding connection by which movement is transmitted to the tractor control mechanism, to arrest the tractor upon disengagement of the coupler.

Like parts are indicated by similar characters of reference throughout the several views.

In the drawings, 1 is the tractor or draft vehicle of which 2 is the carrying wheel, 3 the differential housing, 4 the steering column and 5 the clutch control lever or pedal. Located to the rear of the tractor is the drawn implement or plow of which only the beam 6 is shown. Interconnecting the plow beam 6 with the draft lug 7 of the tractor is the releasable coupler forming the subject matter hereof. The coupling or hitch comprises two arms 8 and 9 interpivoted one to the other at 10 for relative oscillatory movement to and from each other. The arm 8 is connected at a mid-length point with the plow beam 6 by a clevis or attachment member 11. The other arm 9 is similarly connected at a mid-length point with the draft lug 7 upon the tractor by a second clevis or connection 12. It will be understood that the coupling member may be reversed and the arm 8 suitably connected with the tractor or draft vehicle and the arm 9 likewise connected with the trailing vehicle if so desired. The free ends of the arms 8 and 9 are releasably interconnected to each other by a pressure operated latch comprising a latch bar 13 pivoted at 14 to the upper end of the arm 9 and carrying at its free end a roller like detent or abutment which forms the nose or engaging shoulder of the latch. The detent 15 is formed with a longitudinal rabbet or shoulder 16 engaged by the free end of the arm 8 which is preferably though not necessarily out-turned into engagement with such rabbet. The latch bar 13 is yieldingly drawn downward to maintain the rabbet or shoulder 16 in the path of oscillatory movement of the arm 8 by a retracting spring 17 connected at its lower end to the journal stud 10 of the arms 8 and 9 and connected at its upper end to the yielding or pivoted latch bar 13. The latter connection is preferably by means of an adjustable stem 18 by which the spring 17 may be placed under greater or less tension so that the releasable latch is caused to resist more or less pulling effort before disengaging the arm 8.

It is to be noted that the point of engagement of the free end of the arm 8 with the shoulder 16 is somewhat below the center of oscillation of the roller detent 15 or out of dead center relation of said roller detent with the pivotal connection 14 of the latch bar. The pull of the arm 8 against the stop shoulder or nose 16 being below the center of oscillation of the roller detent 15 tends to oscillate such roller abutment or detent about its pivotal connection to the latch bar 13. The lip or shoulder 19 upon the roller detent 15 overhangs the upper end of the arm 8 and upon any rocking or rotary movement of the roller detent 15 under the pressure of the arm 8 such lip or shoulder 19 bearing upon the end of the arm 8 tends to elevate the latch bar 13 against the tension of its retracting spring 17. In other words the roller detent 15 can rotate to release the arm 8 only as the latch bar 13 swings upwardly against the tension of its retracting spring 17. The system of leverage however is such that a spring 17 of moderate tension can resist a considerable pull or draft effort of the arm 8. However, as the draft pull increases beyond the factor of safety and the resistance of the retracting spring 17, the pressure of the end of the arm 8 upon the shoulder 16 of the rotary detent 15 causes such detent or abutment to be gradually turned thereby elevating the latch bar 13 against the tension of the spring 17 until the arm 8 passes entirely free from the rotating detent as shown Fig. 3. Such release of the arm 8 relaxes the pull upon the trailing vehicle. The coupling device will resist disengagement or releasing influence until a predetermined degree of resistance is exceeded whereupon the releasing movement, instead of being gradual or accumulative will be effected comparatively quickly thus giving instant release to the obstructed drawn vehicle. In practice it has been found that this relief movement need not exceed a stroke of 6 inches although the proportions and relative movement of the parts may be modified and changed to meet various conditions of use. It will be noted that the draft and trailing vehicles are never wholly disconnected or detached, but the coupler forms an extensible link which maintains connection between the draft and trailing vehicles and which, upon backing movement of the draft vehicle, will automatically readjust itself to engaged position. During such movement the arms 8 and 9 oscillate toward each other and as the arm 8 passes the end of the latch bar 13 it engages the lip or shoulder 19 of the roller detent 15 carrying it inwardly and upwardly until the parts again assume their interengaged relation as shown in Fig. 2. The outward or releasing movement of the detent 15 is limited by a lug 20 which engages with the end of the latch bar 13 when the detent is in its operated position. Likewise the inward movement or retraction of the latch bar 13 under influence of the spring 17 when the parts are disengaged is limited by the engagement of the latch bar with a shoulder 21 upon the arm 9. The movement of the arms 8 and 9 toward each other during retractive adjustment to re-engaging position or during a backing movement of the draft vehicle is limited by the interengagement of the arms 8 and 9 at the point 22.

While the coupling device may be employed as a releasable hitch to relieve extensive strain without necessarily arresting the draft vehicle, it is preferably employed in association with means for transmitting the relative movement of the coupling members or that of the draft and drawn vehicles to the motive power to arrest the tractor by disengagement of its driving clutch or by other means rendering the motive power ineffectual. To this end there is provided an intermediate connection in the present instance between the tractor and the coupler comprising a cable 29 connected at 30 to the coupler arm 8 and extending thence through a suitable opening in the arm 9 and under a guide roller 31 in the head of the coupling pin 24 and is connected to a reciprocatory bar 32 having operative engagement with the clutch pedal 5 of the tractor. In order to provide a takeup the reciprocatory bar is formed in two sections having relative longitudinal movement, one of these sections being preferably, though not necessarily, channel shaped as shown in Fig. 6, within which the other relatively movable bar is inserted. The relatively movable sections of the bar are interconnected by a retracting spring which draws the bars one toward the other. The telescopic bars 32—33 are normally interengaged or interlocked with each other in their retracted relation by means of the latch arm 40 which engages in registering notches 41, in the respective bars 32—33, to retain such bars against relative longitudinal movement. The forwardly extending end of the telescopic bar is pivotally connected to a rock arm 36 mounted upon the clutch lever or pedal 5. The rock arm 36 is mounted for idle movement in one direction but when moved in the opposite direction is adapted to carry the clutch pedal 5 with it. To this end a bracket is provided for mounting the rock arm 36, which bracket has a grooved base and a corresponding clamp plate conforming to the elbow of the clutch pedal arm or lever 5. The bracket is provided with fingers or ears between which the rock arm 36 is pivoted and the stop pin or stud 39 carried by the bracket 37 extends into the path of movement of the lever 36 when moved rearwardly. The bars 32—33 being intercoupled by the engagement of the detent pawl 40 in the notch 41, moves as a single bar when drawn rearwardly by the cable 29, upon release of the coupler device. This cable 29 being connected directly to the bar 32, which in turn is coupled by the detent 40, to the bar 33, pulls the latter bar in unison with it, and so oscillates the arm 36 to rock the pedal 5. The manual disengagement of the detent 40 from the notch 41 allows the bar 33 to return to normal position independent of the bar 32 and cable 29 under the influence of the pedal spring, leaving the bar 32 in its operative position. This enables the tractor to be operated rearwardly to permit the re-engagement of the coupling device. This rearward movement also retards the bars 32 and 33 to normal relation, where they are re-engaged by the detent 40. This construction permits the clutch pedal 5 to be oscillated downwardly and forwardly through its normal range of movement independent of the rock lever 36, but in the event that the rock lever is oscillated by retraction of the telescopic bar 32—33, the clutch pedal is thereby operated through its clutch disengaging stroke. Thus in the normal operation of the tractor the clutch pedal may be manipulated by the driver independent of and without interference with the coupler take-up mechanism. It is however also under control of the coupler in event that the coupler or interconnection between the draft and trailer vehicles is disengaged. For convenience the operating cable 29 has been shown as being guided over the top of the differential housing 3. Any other form of support or guide may be utilized, and if the clutch pedal or other control member is located sufficiently distant from the automatic coupling device, the cable 29 may pass from the coupler direct to its connection with the take-up bar.

When the coupling device has been disengaged the movement of the tractor in relation with the plow or trailer implement will be sufficient to tension the cable 29 to draw the telescopic bar 32—33 rearwardly as the tractor continues to advance thereby oscillating the clutch pedal 5 to disengage the clutch and arrest the tractor. The tractor is thus brought to a stop before the coupler arms 8 and 9 are extended to the full limit of their possible movement. The tractor, thus having been automatically stopped, cannot be started nor backed to permit re-engagement of the coupler until the clutch pedal is released to permit re-engagement of the driving clutch. To release the clutch pedal the driver will depress the handle of the latch arm 40 of the take-up device thereby disengaging the relatively movable bars 32—33. The clutch pedal 5 or the control lever of the tractor will be returned by its usual retracting spring carrying with it the bar 33 upon which is supported the interengaging pawl 40. The connecting spring between the sections 32—33 is placed under tension by this advance movement of the bar 33 under influence of the clutch pedal, the spring of which is greater in strength than that of the bar retracting spring. The clutch pedal having been released the driving clutch is re-engaged and the tractor is backed under power to return the oscillatory arms 8 and 9 to normal relation and interconnection by the latch bar 13. During such movement the take-up spring will have retracted the sliding bar 32 and cable 29 until the locking pawl 40 re-engages said bar. The particular construction and operation of this take-up device is fully described and claimed in my co-pending application for Letters Patent, Serial No. 590,403, filed Sept. 25, 1922.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms and modifications within the legitimate and valid scope of the appended claims.

Having thus described my invention, I claim:

1. A safety coupling including two relatively movable members connected respectively to draft and drawn devices, and tending to separate under influence of pulling strain, two interpivoted members forming a togglelike member, the opposite ends of the interpivoted members being in engagement respectively with the said movable members, the strain of the draft connection tending to oscillate said interpivoted members about their intermediate pivotal connection to permit relative movement of the first mentioned members and means yieldingly resisting such movement.

2. A safety coupling including two relatively movable members connected respectively to draft and drawn devices, and tending to separate under influence of pulling strain, an intermediate member having therein a knuckle joint, said jointed member forming a stop for limiting the relative movement of the first members under influence of the draft strain, and releasing said members by the flexing movement of said joint, and means for yieldingly resisting the flexing of said jointed stop member.

3. An extensible coupling comprising two arms pivoted together at one end, draft connections between the respective arms and drawing and trailing devices, a grooved roller yieldingly carried upon one of the arms in the groove of which the other arm engages with an off-center pressure when the coupling is subjected to pulling strain whereby the pulling effort tends to rotate the roller to release the engaged arm, and means yieldingly resisting the releasing movement of the roller.

4. An extensible coupling including two relatively movable members connected respectively to draft and drawn devices and tending to separate under the influence of pulling strain, a yielding latch arm carried by one of the members, a roller like detent carried by the latch arm having therein a groove in which the other relatively movable member engages in an off-center relation, with a tendency to rotate the detent under the pulling effort, a shoulder on the detent fulcruming up on the engaged member during such rotary movement of the detent and spring means against the tension of which the latch arm is elevated to permit the disengagement of the detent and engaged member, by the fulcrum action of the detent shoulder upon the engaged member.

5. A safety coupling, including two relatively movable members connected respectively to draft and drawn devices, and tending to separate under the influence of pulling strain, an oscillatory arm carried by one of the members, an abutment member pivoted to the free end of said oscillatory arm and extending in reverse direction into engagement with the other of said relatively movable members, the pulling strain tending to turn said abutment member about its connection with the oscillatory arm, such turning movement necessitating an oscillation of the arm, and spring tension means for said arm resisting oscillatory movement and against the tension of which the parts are movable to release the engaged member.

6. A safety coupling, including two relatively movable members connected respectively to draft and drawn devices, and tending to separate under the influence of pulling strain, and a connecting member having therein a reversible knuckle joint normally in closed or collapsed position with the reversible portion forming an abutment for one of the relatively movable draft members, such connecting member being carried by the other relatively movable draft member and yielding spring means for resisting the relative movement of the parts necessary for reversal of the abutment to release the engaged relatively movable draft member.

7. A safety coupling including two relatively movable members connected respectively to draft and drawn devices, and tending to separate under influence of pulling strain, and a jointed stop member folded upon itself with opposite ends of the folded member connecting the first mentioned relatively movable members, the reversal of the joint of said jointed folded member under pulling strain of the draft connection permitting the separation of said first mentioned members, and means for yieldingly resisting the reversal of the folded member.

8. A safety coupling, including two relatively movable members connected respectively to draft and drawn devices, and tending to separate under the influence of pulling strain, an oscillatory arm carried by one member, a detent pivoted to said arm and extending reversely in infolded relation with the arm, said detent having therein an abutment shoulder engaged by the other relatively movable member and an extension on said detent overlapping the engaged member and bearing thereon to oscillate the arm as the detent is oscillated about its connection thereto under pulling effort, and yielding tension means for the oscillatory arm.

In testimony whereof, I have hereunto set my hand this 20th day of August A. D. 1923.

VERNON H. LAMBERT.